US011525106B2

(12) United States Patent
Chen et al.

(10) Patent No.: US 11,525,106 B2
(45) Date of Patent: Dec. 13, 2022

(54) TETRAACETYLDIAMINE AND TRIACETYLDIAMINE DERIVATIVES USEFUL AS BLEACH ACTIVATORS

(71) Applicants: DOW GLOBAL TECHNOLOGIES LLC, Midland, MI (US); THE BOARD OF TRUSTEES OF THE UNIVERSITY OF ILLINOIS, Urbana, IL (US)

(72) Inventors: Xue Chen, Midland, MI (US); Stephen W. King, Midland, MI (US); Ziyuan Song, Urbana, IL (US); Jianjun Cheng, Champaign, IL (US)

(73) Assignees: DOW GLOBAL TECHNOLOGIES LLC, Midland, MI (US); THE BOARD OF TRUSTEES OF THE UNIVERSITY OF ILLINOIS, Urbana, IL (US)

( * ) Notice: Subject to any disclaimer, the term of this patent is extended or adjusted under 35 U.S.C. 154(b) by 239 days.

(21) Appl. No.: 17/046,990

(22) PCT Filed: Apr. 15, 2019

(86) PCT No.: PCT/US2019/027431
§ 371 (c)(1),
(2) Date: Oct. 12, 2020

(87) PCT Pub. No.: WO2019/204184
PCT Pub. Date: Oct. 24, 2019

(65) Prior Publication Data
US 2021/0155877 A1    May 27, 2021

Related U.S. Application Data

(60) Provisional application No. 62/658,346, filed on Apr. 16, 2018.

(51) Int. Cl.
| | | |
|---|---|---|
| *C11D 3/39* | (2006.01) |
| *C11D 3/395* | (2006.01) |
| *A01N 37/20* | (2006.01) |
| *C11D 3/48* | (2006.01) |
| *C11D 1/00* | (2006.01) |
| *C11D 3/32* | (2006.01) |

(52) U.S. Cl.
CPC ............ *C11D 3/3947* (2013.01); *A01N 37/20* (2013.01); *C11D 1/00* (2013.01); *C11D 3/32* (2013.01); *C11D 3/3907* (2013.01); *C11D 3/3917* (2013.01); *C11D 3/3942* (2013.01); *C11D 3/48* (2013.01)

(58) Field of Classification Search
CPC ........... C11D 1/00; C11D 3/32; C11D 3/3907; C11D 3/3917; C11D 3/3942
USPC .................. 510/309, 313, 376, 372, 501
See application file for complete search history.

(56) References Cited

U.S. PATENT DOCUMENTS

| | | |
|---|---|---|
| 3,539,629 A | 11/1970 | Mackellar et al. |
| 3,886,212 A | 5/1975 | Künstle et al. |
| 5,747,441 A | 5/1998 | Domburg et al. |
| 7,541,324 B2 * | 6/2009 | Reinhardt ............ C11D 3/3907 510/501 |
| 2018/0251710 A1 * | 9/2018 | Pijnenburg .......... C11D 11/0017 |

FOREIGN PATENT DOCUMENTS

| | | |
|---|---|---|
| EP | 1 269 844 | 1/2003 |
| WO | 2017/040501 | 3/2017 |

OTHER PUBLICATIONS

The International Search Report (ISR) with Written Opinion for PCT/US2019/027431 dated Jul. 18, 2019, pp. 1-14.

* cited by examiner

*Primary Examiner* — Gregory R Delcotto
(74) *Attorney, Agent, or Firm* — McDonnell Boehnen Hulbert & Berghoff LLP

(57) ABSTRACT

This disclosure relates generally to bleach activator compositions. This disclosure relates more particularly to tetraacetyldiamine and/or triacetyldiamine derivatives and compositions thereof and to their use as bleach activators, and methods for using them as detergents or biocides.

20 Claims, 2 Drawing Sheets

(1) Blank
(2) DAED
(3) compound 3
(4) compound 2
(5) compound 1
(6) TAED

TETRAACETYLDIAMINE AND TRIACETYLDIAMINE DERIVATIVES USEFUL AS BLEACH ACTIVATORS

CROSS-REFERENCE TO RELATED APPLICATION

This application is a U.S. national phase of International Application No. PCT/US2019/027431, filed Apr. 15, 2019, which claims priority to U.S. Provisional Application No. 62/658,346, filed Apr. 16, 2018, the disclosure of which is hereby incorporated herein by reference in its entirety.

BACKGROUND OF THE INVENTION

Field of the Invention

This disclosure relates generally to bleach activator compositions. This disclosure relates more particularly to tetraacetyldiamine and/or triacetyldiamine derivatives and compositions thereof and to their use as bleach activators, and methods for using them as detergents or biocides.

Description of Related Art

Peroxygen bleach compounds are well known for their ability to remove stains from substrates. Such bleaching agents include hydrogen peroxide, or substances that can generate perhydroxyl radical, such as inorganic or organic peroxides. Generally, the peroxygen bleach compounds or hydrogen peroxide must be activated. One method of activation is to employ wash temperatures greater than 60° C. High temperatures required for activation of the peroxygen bleach compound can cause premature damage to the substrate (particularly the fabric substrate) and often damage the dyes used in fabric substrate.

Another known approach of activation is the use of organic precursor compounds along with a peroxygen bleach compound. Addition of the organic precursors, often also referred to as bleach activators, into compositions having peroxygen bleach compound improves bleaching activity at lower wash temperatures, e.g. 40 to 60° C. Examples of bleach activators are tetraacetylethylenediamine (TAED) and sodium nonanoyloxybenzenesulfonate (NOBS). The bleach activators react with the perhydroxide anion (OOH—) of the hydrogen peroxide released by the peroxygen bleach compound in the aqueous solution to form a peroxyacid which is more reactive as a bleaching agent than the peroxide bleach alone.

TAED is able to react with peroxide derivatives (such as a perborate, a percarbonate, or a persulfate) to generate peracetic acid, which enables efficient bleaching at low temperatures (<60° C.). A major disadvantage for TAED is the competitive hydrolysis under basic conditions, which consumes TAED and generates acetic acid, which has no bleaching action and leads to low bleaching efficiency. As a result, TAED loses its bleaching activity with longer shelf life, particularly in liquid detergent formulations. Therefore, there is a need for efficient bleach activators that have low competitive hydrolysis under basic conditions (i.e., have longer shelf life in liquid formulations) but remain capable of bleaching at low temperatures (<60° C.).

SUMMARY OF THE INVENTION

The present inventors have found that the compositions of the disclosure have better hydrolytic stability compared to TAED. At the same time, the compositions of the disclosure retain the bleaching activity equivalent to TAED compositions. Therefore, the compositions of the disclosure have longer shelf life, particularly in liquid detergent formulations. Further, the compounds of formula (I) can be easily dissolved in aqueous environment compared with TAED, which cannot be easily solubilized in water without the assistance of organic solvent. This allows for the compositions of the disclosure to be included in liquid detergent compositions without the use of additional solvents, and thus making them more environmentally friendly.

Thus, one aspect of the disclosure provides aqueous compositions including one or more active oxygen agents, and at least one compound of the formula (I):

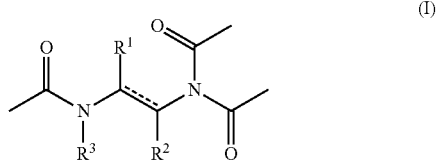

(I)

or a salt thereof, wherein

==== represents a single or double bond, provided that the bond satisfies the valence requirement of the C atoms;

$R^1$ is $C_1$-$C_4$ alkyl, $C_2$-$C_4$ alkenyl, or $C_2$-$C_4$ alkynyl, each of which is independently optionally substituted with one or more $R^4$;

$R^2$ is hydrogen, $C_1$-$C_4$ alkyl, $C_2$-$C_4$ alkenyl, or $C_2$-$C_4$ alkynyl, each of which is independently optionally substituted with one or more $R^5$;

or $R^1$ and $R^2$ together with the atoms to which they are attached form an aryl, heteroaryl, heterocyclyl, or $C_5$-$C_8$ cycloalkyl ring; and $R^3$ is hydrogen or acetyl;

wherein each $R^4$ and $R^5$ are independently selected from the group consisting of $C_3$-$C_8$ cycloalkyl, aryl, heteroaryl, and heterocyclyl.

Another aspect of the disclosure provides a detergent composition including one or more surfactants, one or more active oxygen agents, and at least one compound of the formula (I).

Another aspect of the disclosure provides methods of treating a soiled substrate (e.g., ceramic, fabric, or metal substrate). Such methods include contacting the substrate with a detergent composition of the disclosure.

Another aspect of the disclosure provides methods of disinfecting a substrate (e.g., ceramic, fabric, or metal substrate). Such methods include contacting the substrate with a composition of the disclosure.

Another aspect of the disclosure provides methods of bleaching a substrate (e.g., ceramic, fabric, or metal substrate). Such methods include contacting the substrate with a composition of the disclosure.

In another aspect, the disclosure provides methods for producing a peracetic acid solution. Such methods include reacting an active oxygen agent and a compound of the formula (I) in aqueous solution to perhydrolyse the amide bond.

In another aspect, the disclosure provides methods for preparing a compound of the formula (I). Such methods include contacting a compound of formula (II)

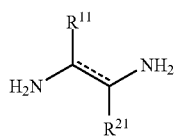

or a salt thereof, wherein
- ==== represents a single or double bond, provided that the bond satisfies the valence requirement of the C atoms;
- $R^{11}$ is $C_1$-$C_4$ alkyl, $C_2$-$C_4$ alkenyl, or $C_2$-$C_4$ alkynyl, each of which is independently optionally substituted with one or more $R^{41}$;
- $R^{21}$ is hydrogen, $C_1$-$C_4$ alkyl, $C_2$-$C_4$ alkenyl, or $C_2$-$C_4$ alkynyl, each of which is independently optionally substituted with one or more $R^{51}$;
- or $R^{11}$ and $R^{21}$ together with the atoms to which they are attached form an aryl, heteroaryl, heterocyclyl, or $C_5$-$C_8$ cycloalkyl ring; and
- wherein each $R^{41}$ and $R^{51}$ are independently selected from the group consisting of $C_3$-$C_8$ cycloalkyl, aryl, heteroaryl, and heterocyclyl, with acetic anhydride or acetyl chloride, and a base.

BRIEF DESCRIPTION OF THE DRAWINGS

The accompanying drawings are included to provide a further understanding of the methods and compositions of the disclosure, and are incorporated in and constitute a part of this specification. The drawings illustrate one or more embodiment(s) of the disclosure, and together with the description serve to explain the principles and operation of the disclosure.

DETAILED DESCRIPTION OF THE INVENTION

Figure 1:
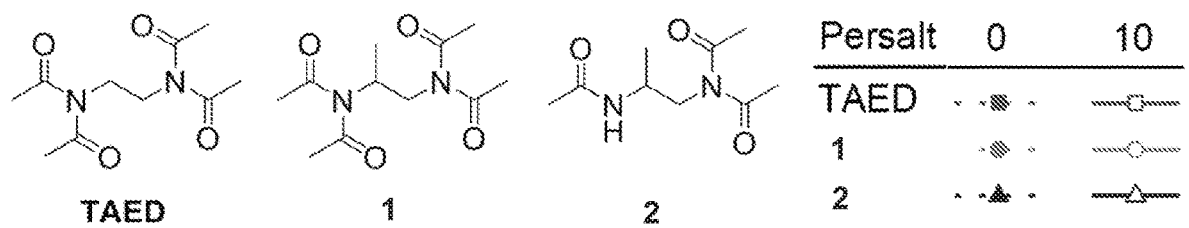
FIG. 1 illustrates the degradation kinetics of TAED, N,N'-(propane-1,2-diyl)bis(N-acetylacetamide) (1), and N-(2-acetamidopropyl)-N-acetylacetamide (2) at pH 8.0 in the absence (solid symbols with dotted lines) and presence (open symbols with solid lines) of sodium perborate (10 equiv.). (A) Normalized degradation plots of the tested molecules. (B) Kinetic plots of the tested molecules.
Figure 1:
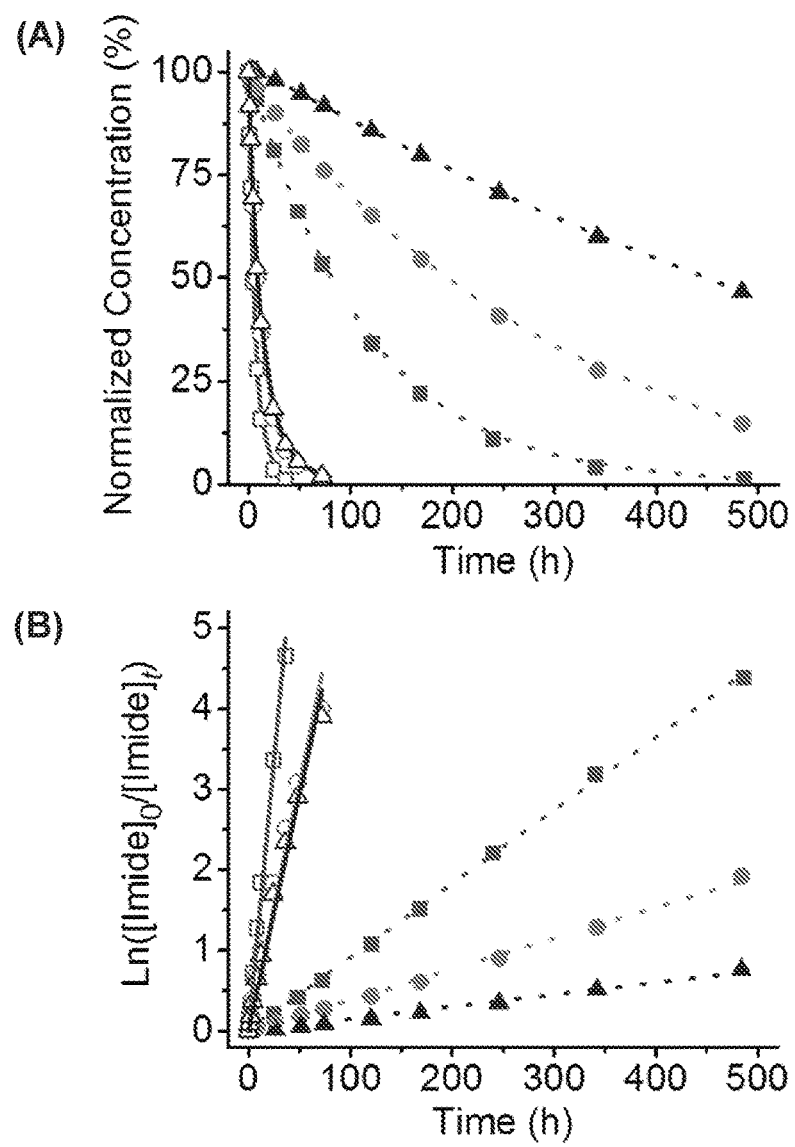

Before the disclosed methods and materials are described, it is to be understood that the aspects described herein are not limited to specific embodiments, or configurations, and as such can, of course, vary. It is also to be understood that the terminology used herein is for the purpose of describing particular aspects only and, unless specifically defined herein, is not intended to be limiting.

In view of the present disclosure, the compositions and methods described herein can be configured by the person of ordinary skill in the art to meet the desired need. In general, the disclosed compositions and methods provide improvements of bleach activators, particularly bleach activators used in detergent and biocide formulations. For example, in certain embodiments, the compositions of the disclosure (i.e., the compositions that include one or more of compounds of formula (I)) have better hydrolytic stability compared to TAED compositions. Specifically, N,N'-(propane-1,2-diyl)bis(N-acetylacetamide) (1) unexpectedly exhibits slower hydrolysis compared to TAED at pH values between about 5 and 9. The half-life of 1 is 1.5 times longer than the half-life of TAED at pH 8.0, and 2.6 times longer at pH 9.0. Similarly, N-(2-acetamidopropyl)-N-acetylacetamide (2) exhibited an even slower hydrolysis at a basic pH. The half-life of 2 is 5.7 times longer than the half-life of TAED at pH 8.0, and 5.8 times longer at pH 9.0. Without being bound by a particular theory, it is believed that $R^1$ and/or $R^2$ substituents provide sufficient steric hindrance to slow down the hydrolytic degradation.

In certain embodiments, the compositions of the disclosure (i.e., the compositions that include one or more of compounds of formula (I)) retain the bleaching activity equivalent to TAED compositions. Specifically, the rate of perhydrolysis in the presence of 10 equivalents of sodium perborate is comparable between 1 and TAED, indicating higher efficiency of 1 as a bleach activator due to its slower hydrolysis. The bleaching studies with blue-color dye also showed similar effectiveness of 1 and TAED to bleach the dye.

Thus, one aspect of the disclosure provides aqueous compositions including one or more active oxygen agents, and at least one compound of the formula (I):

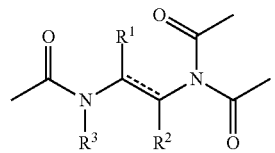

or a salt thereof, wherein
- ==== represents a single or double bond, provided that the bond satisfies the valence requirement of the C atoms;
- $R^1$ is $C_1$-$C_4$ alkyl, $C_2$-$C_4$ alkenyl, or $C_2$-$C_4$ alkynyl, each of which is independently optionally substituted with one or more $R^4$;
- $R^2$ is hydrogen, $C_1$-$C_4$ alkyl, $C_2$-$C_4$ alkenyl, or $C_2$-$C_4$ alkynyl, each of which is independently optionally substituted with one or more $R^5$;
- or $R^1$ and $R^2$ together with the atoms to which they are attached form an aryl, heteroaryl, heterocyclyl, or $C_5$-$C_8$ cycloalkyl ring; and
- $R^3$ is hydrogen or acetyl;
- wherein each $R^4$ and $R^5$ are independently selected from the group consisting of $C_3$-$C_8$ cycloalkyl, aryl, heteroaryl, and heterocyclyl.

As provided above, the compositions of the disclosure include at least one compound of formula (I).

In certain embodiments, the compounds of formula (I) are those where ==== represents a single bond, e.g., the compound (I) is of formula (I-1):

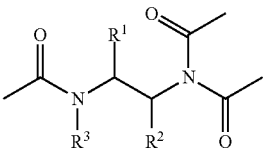

In one embodiment, the disclosure provides compounds of formula (I) or (I-1) wherein $R^1$ is $C_1$-$C_4$ alkyl optionally substituted with one or more $R^4$. Other embodiments are those where $R^1$ is $C_1$-$C_3$ alkyl optionally substituted with one or more $R^4$. Other embodiments are those where $R^1$ is $C_1$-$C_2$ alkyl optionally substituted with one or more $R^4$.

In one embodiment, the disclosure provides compounds of formula (I) or (I-1) wherein $R^1$ unsubstituted $C_1$-$C_4$ alkyl. Other embodiments are those where $R^1$ is unsubstituted $C_1$-$C_3$ alkyl; or $R^1$ is unsubstituted $C_1$-$C_2$ alkyl. In still other embodiments, $R^1$ is methyl. In still other embodiments, $R^1$ is ethyl.

Another embodiment of the disclosure provides compounds of formula (I) or (I-1) wherein $R^2$ is hydrogen.

Yet another embodiment of the disclosure provides compounds of formula (I) or (I-1) wherein $R^2$ is $C_1$-$C_4$ alkyl optionally substituted with one or more $R^5$. Other embodiments are those where $R^2$ is $C_1$-$C_3$ alkyl optionally substituted with one or more $R^5$. Other embodiments are those where $R^2$ is $C_1$-$C_2$ alkyl optionally substituted with one or more $R^5$.

In one embodiment, the disclosure provides compounds of formula (I) or (I-1) wherein $R^2$ unsubstituted $C_1$-$C_4$ alkyl. Other embodiments are those where $R^2$ is unsubstituted $C_1$-$C_3$ alkyl; or $R^2$ is unsubstituted $C_1$-$C_2$ alkyl. In still other embodiments, $R^2$ is methyl. In still other embodiments, $R^2$ is ethyl.

Particular embodiments of the disclosure provide compounds of formula (I) wherein $R^1$ and $R^2$ together with the atoms to which they are attached form an aryl, heteroaryl, heterocyclyl, or $C_5$-$C_8$ cycloalkyl ring. Some embodiments of the disclosure provide compounds of formula (I) wherein $R^1$ and $R^2$ together with the atoms to which they are attached form an aryl or $C_5$-$C_8$ cycloalkyl ring. In some embodiments, $R^1$ and $R^2$ together with the atoms to which they are attached form a phenyl ring when ==== represents a double bond. In some embodiments, $R^1$ and $R^2$ together with the atoms to which they are attached form a cyclopentyl or cyclohexyl ring when ==== represents a single bond. Some embodiments of the disclosure provide compounds of formula (I) wherein $R^1$ and $R^2$ together with the atoms to which they are attached form a heteroaryl or heterocyclyl ring.

Another embodiment of the disclosure provides compounds of formula (I) or (I-1) wherein $R^3$ is acetyl.

Another embodiment of the disclosure provides compounds of formula (I) or (I-1) wherein $R^3$ is hydrogen.

For example, in certain embodiments of the disclosure, the compound of formula (I) is

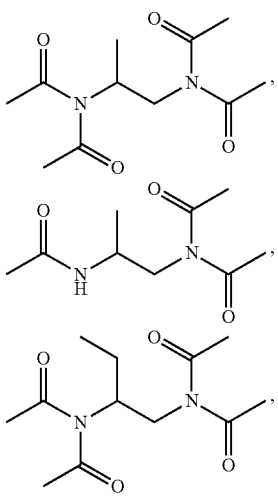

-continued

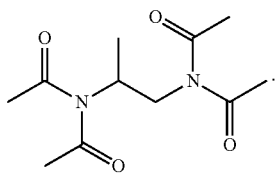 [SMILES: CC(=O)N(CC(C)N(C(C)=O)C(C)=O)C(C)=O]

In certain embodiments of the disclosure, the compound of formula (I) is

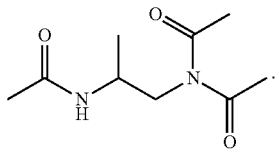

In other embodiments of the disclosure, the compound of formula (I) is

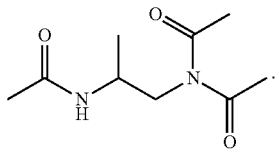

In certain embodiments of the composition of the disclosure, the molar ratio of the peroxide in the one or more active oxygen agents and the at least one compound of formula (I) is about 1:1 to about 10:1. For example, the molar ratio of the peroxide in the one or more active oxygen agents and the at least one compound of formula (I) is about 1:1 to about 7:1, or about 1:1 to about 5:1, or about 1:1 to about 3:1, or about 2:1 to about 10:1, or about 2:1 to about 7:1, or about 2:1 to about 5:1, or about 2:1 to about 3:1, or about 3:1 to about 10:1, or about 3:1 to about 7:1, or about 3:1 to about 5:1, In certain embodiments, the composition of the disclosure is substantially free of TAED, e.g., wherein no more than 1 wt % (e.g., no more than 0.5 wt %, or no more than 0.1 wt %, or no more than 0.01 wt %, or no more than 0.001 wt %, or even 0 wt %) of TAED is present in the composition, based on the total weight of the composition.

In certain embodiments of the compositions of the disclosure, the compound of formula (I) is not:
N,N'-(propane-1,2-diyl)bis(N-acetylacetamide),
N,N'-(butane-2,3-diyl)bis(N-acetylacetamide), and/or
N,N'-(cyclohexane-1,2-diyl)bis(N-acetylacetamide).

In certain embodiments of the disclosure, the composition includes the at least one compound of formula (I) in an amount up about 70 wt % based on the total weight of the composition. For example, in certain embodiments of the composition as otherwise described herein, the at least one compound of formula (I) is present in an amount up to about 50 wt %, or up to about 30 wt %, or up to about 15 wt %, or up to about 10 wt %, or up to about 5 wt %, or up to about 3 wt %, or up to about 2 wt %. In certain embodiments, the one or more active oxygen agents is present in an amount of about 10 wt % to about 70 wt %, for example, about 20 wt % to about 70 wt %, or about 25 wt % to about 70 wt %, or about 30 wt % to about 70 wt %, or about 40 wt % to about 70 wt %, or about 20 wt % to about 50 wt %, or about 25 wt % to about 50 wt %, or about 30 wt % to about 50 wt %. For example, in certain embodiments of the compositions as otherwise described herein, the at least one compound of formula (I) is present in an amount in the range of about 0.5 wt % to about 10 wt %, e.g., about 0.5 wt % to about 8 wt %, or about 0.5 wt % to about 5 wt %, or about 0.5 wt % to about 3 wt %, or about 0.5 wt % to about 2 wt %, or about 1 wt % to about 10 wt %, or about 1 wt % to about 8 wt %, or about 1 wt % to about 5 wt %, or about 5 wt % to about 10 wt %.

As described above, the compositions of the disclosure include one or more active oxygen agents. Suitable active oxygen agents include, but are not limited to, peroxygen compounds, peroxygen compound adducts, hydrogen peroxide, hydrogen peroxide liberating or generating compounds, inorganic or organic peroxyacids, peroxycarboxylic acids, percarbonates, perborates, peroxyhydrates, persilicates, persulfates, and combinations thereof.

Active oxygen agents may be peroxygen compounds, including for example hydrogen peroxide, group 1 (IA) active oxygen compounds (e.g., sodium peroxide), group 2 (IIA) active oxygen compounds (e.g., magnesium peroxide), group 12 (IIB) active oxygen compounds (e.g., zinc peroxide), group 13 (IIIA) active oxygen compounds (e.g., perborates), group 14 (IVA) active oxygen compounds (e.g., persilicates and peroxycarbonates), group 15 (VA) active oxygen compounds (e.g., perphosphates), group 16 (VIA) active oxygen compounds (e.g., peroxysulfuric acids and their salts), group 17 (VITA) active oxygen compounds (e.g., sodium periodate), and transition metal peroxides. Any of a variety of hydrogen peroxide and/or hydrogen peroxide adducts may be suitable for use in the present disclosure. Sodium percarbonate ($2Na_2CO_3 \cdot 3H_2O_2$) can also be employed as the active oxygen agent. Active oxygen agents, including organic active oxygen compounds may also include peroxycarboxylic acids, such as a mono- or di-peroxycarboxylic acid, an alkali metal salt including these types of compounds, or an adduct of such a compound. Peracid, peroxyacid, percarboxylic acid and peroxycarboxylic acid each refer synonymously to acids having the general formula $R(CO_3H)_n$, where R can be saturated or unsaturated, substituted or unsubstituted alkyl, arylalkyl, cycloalkyl, aromatic, heterocyclic, or ester group, and n is one, two, or three.

In certain embodiments of the disclosure, the composition includes the one or more active oxygen agents in an amount up about 70 wt % based on the total weight of the composition. For example, in certain embodiments of the composition as otherwise described herein, the one or more active oxygen agents is present in an amount up to about 50 wt %, or up to about 30 wt %, or up to about 15 wt %, or up to about 10 wt %, or up to about 5 wt %, or up to about 3 wt %, or up to about 2 wt %. In certain embodiments, the one or more active oxygen agents is present in an amount of about 20 wt % to about 70 wt %, for example, about 25 wt % to about 70 wt %, or about 30 wt % to about 70 wt %, or about 40 wt % to about 70 wt %, or about 20 wt % to about 50 wt %, or about 25 wt % to about 50 wt %, or about 30 wt % to about 50 wt %. For example, in certain embodiments of the compositions as otherwise described herein, the one or more active oxygen agents is present in an amount in the range of about 0.5 wt % to about 20 wt %, e.g., about 0.5 wt % to about 15 wt %, or about 0.5 wt % to about 10 wt %, or about 0.5 wt % to about 5 wt %, or about 0.5 wt % to about 2 wt %, or about 1 wt % to about 20 wt %, or about 1 wt % to about 15 wt %, or about 1 wt % to about 10 wt %, or about 1 wt % to about 5 wt %, or about 5 wt % to about 20 wt %, or about 5 wt % to about 15 wt %, or about 5 wt % to about 10 wt %.

Another aspect of the disclosure provides a detergent composition including one or more surfactants, one or more active oxygen agents, and at least one compound of the formula (I) as described herein.

The surfactant may be a soap or an anionic, nonionic, amphoteric, zwitterionic or cationic surfactant or mixtures thereof. In general, the nonionic and anionic surfactant may be chosen from those commonly known and used in the art. For example, suitable anionic surfactants include, but are not limited to, water-soluble alkali metal salts of organic sulfates and sulfonates having $C_8$-$C_{22}$ alkyl radicals (e.g. sodium and potassium alkyl sulfates obtained by sulfating higher $C_8$-$C_{18}$ alcohols from tallow or coconut oil; sodium and potassium alkyl $C_9$-$C_{20}$ benzene sulfonates; sodium alkyl glyceryl ether sulfates, especially those ethers of the higher alcohols derived from tallow or coconut oil and synthetic alcohols derived from petroleum). In certain embodiments, the anionic surfactants may be sodium lauryl ether sulfate (SLES), sodium $C_{10}$-$C_{15}$ alkyl benzene sulfonates (LAS), sodium $C_{12}$-$C_{18}$ alkyl sulfates (PAS).

Suitable nonionic surfactants include, but are not limited to, the reaction products of compounds having a hydrophobic group and a reactive hydrogen atom, for example, aliphatic alcohols, acids, amides or alkyl phenols with alkylene oxides, especially ethylene oxide either alone or with propylene oxide. In certain embodiments, the nonionic surfactants may be $C_6$-$C_{22}$ alkyl phenol-ethylene oxide condensates, generally having 5 to 25 EO, i.e. 5 to 25 units of ethylene oxide per molecule, and the condensation products of aliphatic $C_8$-$C_{18}$ primary or secondary linear or branched alcohols with ethylene oxide, generally 5 to 50 EO (e.g., 10 to 50 EO, or 20 to 35 EO).

In certain embodiments, the one or more surfactants includes soap. The fatty acid soap may contain from about 16 to about 22 carbon atoms, preferably in a straight chain configuration. Preferred soap may be derived from saturated and non-saturated fatty acids obtained from natural sources and synthetically prepared. Examples of such fatty acids include capric, lauric, myristic, palmitic, stearic, oleic, linoleic, and linolenic acid.

In certain embodiments, the one or more surfactants may be a mixture of anionic and nonionic surfactants.

Amphoteric or zwitterionic surfactants may also be used in the detergent compositions of the disclosure. In certain embodiments, amphoteric and/or zwitterionic surfactants may be used in combinations with anionic and/or nonionic surfactants.

In certain embodiments of the disclosure, the detergent composition includes the one or more surfactants in an amount up about 70 wt % based on the total weight of the detergent composition. For example, in certain embodiments of the detergent composition as otherwise described herein, the one or more surfactants is present in an amount up to about 50 wt %, or up to about 30 wt %, or up to about 15 wt %, or up to about 10 wt %, or up to about 5 wt %, or up to about 3 wt %, or up to about 2 wt %. In certain embodiments, the one or more surfactants is present in an amount of about 15 wt % to about 70 wt %, for example, about 20 wt % to about 70 wt %, or about 25 wt % to about 70 wt %, or about 30 wt % to about 70 wt %, or about 40 wt % to about 70 wt %, or about 15 wt % to about 50 wt %, or about 20 wt % to about 50 wt %, or about 25 wt % to about 50 wt %, or about 30 wt % to about 50 wt %. In certain embodiments, the one or more surfactants is present in an amount in the range of about 0.5 wt % to about 15 wt %, e.g., about 0.5 wt % to about 10 wt %, or about 0.5 wt % to about 5 wt %, or about 0.5 wt % to about 3 wt %, or about 0.5 wt % to about 2 wt %, or about 0.5 wt % to about 1.5 wt %, or about 1 wt % to about 15 wt %, or about 1 wt % to about 10 wt %, or about 1 wt % to about 5 wt %, or about 1 wt % to about 3 wt %.

In certain embodiments of the disclosure, the detergent composition includes the one or more active oxygen agents in an amount up to about 20 wt % based on the total weight of the detergent composition. For example, in certain embodiments of the detergent compositions as otherwise described herein, the one or more active oxygen agents is present in an amount in the range of about 0.5 wt % to about 20 wt %, e.g., about 0.5 wt % to about 15 wt %, or about 0.5 wt % to about 10 wt %, or about 0.5 wt % to about 5 wt %, or about 0.5 wt % to about 2 wt %, or about 1 wt % to about 20 wt %, or about 1 wt % to about 15 wt %, or about 1 wt % to about 10 wt %, or about 1 wt % to about 5 wt %, or about 5 wt % to about 20 wt %, or about 5 wt % to about 15 wt %, or about 5 wt % to about 10 wt %.

In certain embodiments of the disclosure, the detergent composition includes the at least one compound of formula (I) in an amount up to about 10 wt % based on the total weight of the detergent composition. For example, in certain embodiments of the compositions as otherwise described herein, the at least one compound of formula (I) is present in an amount in the range of about 0.5 wt % to about 10 wt %, e.g., about 0.5 wt % to about 8 wt %, or about 0.5 wt % to about 5 wt %, or about 0.5 wt % to about 3 wt %, or about 0.5 wt % to about 2 wt %, or about 1 wt % to about 10 wt %, or about 1 wt % to about 8 wt %, or about 1 wt % to about 5 wt %, or about 5 wt % to about 10 wt %.

The detergent compositions of the disclosure may also include builders. One of skill in the art would be able to select suitable builders based on the desired use. Suitable builders include, but are not limited to, calcium sequestrant materials, precipitating materials, calcium ion-exchange materials, and mixtures thereof. Examples of calcium sequestrant materials include alkali metal polyphosphates, such as sodium tripolyphosphate, and organic sequestrants, such as ethylene diamine tetra-acetic acid. Examples of precipitating builder materials include sodium orthophosphate and sodium carbonate. Examples of calcium ion-exchange builder materials include the various types of water-insoluble crystalline or amorphous aluminosilicates, such as zeolite A, zeolite B (also known as zeolite P), zeolite C, zeolite X, zeolite Y, and the like. In certain embodiments, the insoluble inorganic builder may have the size in the range 0.1 to 10 μm (as measured by a particle size analyzer using laser diffraction). In certain embodiments, the amount of builder in the detergent composition is in the range of about 1 wt % to about 40 wt %, based on the total weight of the detergent composition.

Disclosed detergent composition may include one or more of other ingredients, such as enzymes, polymers, perfumes, fluorescent agents, soil release polymers, germicides, fabric softeners, colorants, and colored speckles such as blue speckles.

The detergent compositions of the disclosure may be in different forms, such as powders, tablets, liquids, bars, crystals, gels, capsules, or aqueous or non-aqueous liquids, or carried on sheets or other substrates or in pouches. In certain embodiments, the detergent composition of the disclosure is in aqueous liquid form. In certain embodiments, the detergent composition of the disclosure is in gel form.

The detergent composition described herein may be used to make any preparation that can be used for the purpose of treating (e.g., bleaching) any suitable substrate, for example, laundry cleaning, laundry bleaches, bleach pre-treaters, hard surface cleaning (including cleaning of lavatories, kitchen work surfaces, floors, mechanicals, etc.), or automatic dishwashing compositions.

The detergent composition, when dissolved in water (e.g., during the first use cycle), has a pH-value within the range of about 8 to about 12, e.g., within the range of about 8 to about 11, or about 8 to about 10, or about 8 to about 9, or about 8.2 to about 9.8, or about 8.3 to about 9.7, or about 8.4 to about 9.6, or about 8.6 to about 9.5, or about 8.8 to about 9.3.

Another aspect of the disclosure provides methods for producing a peracetic acid solution, the method including reacting an active oxygen agent and a compound of the formula (I) as described herein in aqueous solution to perhydrolyse the amide bond.

In certain embodiments of this method, the molar ratio of the active oxygen agent and the compound of the formula (I) is in the range of about 1:1 to about 3:1.

Another aspect of the disclosure provides methods for preparing a compound of the formula (I) as described herein, the method including contacting a compound of formula (II)

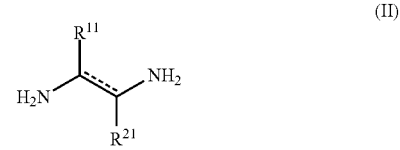

(II)

or a salt thereof, wherein
==== represents a single or double bond, provided that the bond satisfies the valence requirement of the C atoms;
$R^{11}$ is $C_1$-$C_4$ alkyl, $C_2$-$C_4$ alkenyl, or $C_2$-$C_4$ alkynyl, each of which is independently optionally substituted with one or more $R^{41}$;
$R^{21}$ is hydrogen, $C_1$-$C_4$ alkyl, $C_2$-$C_4$ alkenyl, or $C_2$-$C_4$ alkynyl, each of which is independently optionally substituted with one or more $R^{51}$;
or $R^{11}$ and $R^{21}$ together with the atoms to which they are attached form an aryl, heteroaryl, heterocyclyl, or $C_5$-$C_8$ cycloalkyl ring; and
wherein each $R^{41}$ and $R^{51}$ are independently selected from the group consisting of $C_3$-$C_8$ cycloalkyl, aryl, heteroaryl, and heterocyclyl,
with acetic anhydride or acetyl chloride, and a base.

In certain embodiments of this method, the molar ratio of the compound of formula (II):acetic anhydride:the base is about 1:4:3 to about 1:8:4.

The synthesis of TAED is well known in the art. Acetylation of the diamine can be accomplished with acetylating agents which include acetic anhydride, acetic acid, or ketene either in a stoichiometric amount or a molar excess. Optionally a base (e.g., an amine) may be added as a catalyst to accelerate the reaction or at a near molar equivalence (relative to amount of acetic acid produced) to neutralize the acetic acid generated from the reaction of the diamine with acetic anhydride. Optionally, a solvent (e.g., hydrocarbon) may be used to aid in the removal of water (via removal overhead) from the reaction mixture. The synthesis can either be a two-step reaction wherein the N, N' diacetyldiamine is first synthesized and isolated to be used as an intermediate for the production of the tri- or tetraacetyldiamine, or it can be a one-step reaction whereby the intermediate diacetyldiamine is not isolated. If a one-step reaction is employed, the acetylating agent is present in an amount at least greater than 2 molar equivalents of the diamine.

In certain embodiments, contacting is in the absence of solvent (i.e., contacting is in neat solution). In certain embodiments, contacting in in the presence of non-polar solvents. Suitable solvents include, but are not limited to, solvents with high boiling points such as toluene and xylene.

Definitions

The following terms and expressions used have the indicated meanings.

Throughout this specification, unless the context requires otherwise, the word "comprise" and "include" and variations (e.g., "comprises," "comprising," "includes," "including") will be understood to imply the inclusion of a stated component, feature, element, or step or group of components, features, elements or steps but not the exclusion of any other integer or step or group of integers or steps.

As used in the specification and the appended claims, the singular forms "a," "an" and "the" include plural referents unless the context clearly dictates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

All percentages, ratios and proportions herein are by weight, unless otherwise specified. A weight percent (weight %, also as wt %) of a component, unless specifically stated to the contrary, is based on the total weight of the formulation or composition in which the component is included (e.g., on the total amount of the detergent composition). All mol % values are based on the moles of the active compounds.

The term "alkenyl" as used herein, means a straight or branched chain hydrocarbon containing from 2 to 10 carbons, unless otherwise specified, and containing at least one carbon-carbon double bond. Representative examples of alkenyl include, but are not limited to, ethenyl, 2-propenyl, 2-methyl-2-propenyl, 3-butenyl, 4-pentenyl, 5-hexenyl, 2-heptenyl, 2-methyl-1-heptenyl, 3-decenyl, and 3,7-dimethylocta-2,6-dienyl, and 2-propyl-2-heptenyl. The term "alkenylene" refers to a divalent alkenyl group, where alkenyl is as defined herein.

The term "alkyl" as used herein, means a straight or branched chain hydrocarbon containing from 1 to 10 carbon atoms unless otherwise specified. Representative examples of alkyl include, but are not limited to, methyl, ethyl, n-propyl, iso-propyl, n-butyl, sec-butyl, iso-butyl, tert-butyl, n-pentyl, isopentyl, neopentyl, n-hexyl, 3-methylhexyl, 2,2-dimethylpentyl, 2,3-dimethylpentyl, n-heptyl, n-octyl, n-nonyl, and n-decyl. The term "alkylene" refers to a divalent alkyl group, where alkyl is as defined herein.

The term "alkynyl" as used herein, means a straight or branched chain hydrocarbon group containing from 2 to 10 carbon atoms unless otherwise specified, and containing at least one carbon-carbon triple bond. Representative examples of alkynyl include, but are not limited, to acetylenyl, 1-propynyl, 2-propynyl, 3-butynyl, 2-pentynyl, and 1-butynyl. The term "alkynylene" refers to a divalent alkynyl group, where alkynyl is as defined herein.

The term "aryl," as used herein, means a phenyl (i.e., monocyclic aryl), or a bicyclic ring system containing at least one phenyl ring or an aromatic bicyclic ring containing only carbon atoms in the aromatic bicyclic ring system, or a polycyclic ring system containing at least one phenyl ring. The bicyclic aryl can be azulenyl, naphthyl, or a phenyl fused to a cycloalkyl, a cycloalkenyl, or a heterocyclyl. The bicyclic or polycyclic aryl is attached to the parent molecular moiety through any carbon atom contained within the phenyl portion of the bicyclic or polycyclic system, or any carbon atom with the napthyl, azulenyl, anthracene, or pyrene ring.

The term "cycloalkyl" as used herein, means a monocyclic or a bicyclic cycloalkyl ring system. Monocyclic ring systems are cyclic hydrocarbon groups containing from 3 to 10 carbon atoms, where such groups can be saturated or unsaturated, but not aromatic. In certain embodiments, cycloalkyl groups are fully saturated. Examples of monocyclic cycloalkyls include cyclopropyl, cyclobutyl, cyclopentyl, cyclopentenyl, cyclohexyl, cyclohexenyl, cycloheptyl, and cyclooctyl. Representative examples of bicyclic ring systems include, but are not limited to, bicyclo[3.1.1]heptane, bicyclo[2.2.1]heptane, bicyclo[2.2.2]octane, bicyclo[3.2.2]nonane, bicyclo[3.3.1]nonane, and bicyclo[4.2.1]nonane.

The term "heteroaryl," as used herein, means a monocyclic heteroaryl or a bicyclic or polycyclic ring system containing at least one heteroaromatic ring. The monocyclic heteroaryl can be a 5 or 6 membered ring. The 5 membered ring consists of two double bonds and one, two, three or four nitrogen atoms and optionally one oxygen or sulfur atom. The 6 membered ring consists of three double bonds and one, two, three or four nitrogen atoms. The 5 or 6 membered heteroaryl is connected to the parent molecular moiety through any carbon atom or any nitrogen atom contained within the heteroaryl. The bicyclic or polycyclic heteroaryl consists of a heteroaryl fused to a phenyl, a cycloalkyl, a cycloalkenyl, a heterocyclyl, or a heteroaryl. Representative examples of heteroaryl include, but are not limited to, furyl, imidazolyl, isoxazolyl, isothiazolyl, oxadiazolyl, oxazolyl, pyridinyl, pyridazinyl, pyrimidinyl, pyrazinyl, pyrazolyl, pyrrolyl, tetrazolyl, thiadiazolyl, thiazolyl, thienyl, triazolyl, triazinyl, benzimidazolyl, benzofuranyl, benzothienyl, benzoxadiazolyl, benzoxathiadiazolyl, benzothiazolyl, cinnolinyl, 5,6-dihydroquinolin-2-yl, 5,6-dihydroisoquinolin-1-yl, furopyridinyl, indazolyl, indolyl, isoquinolinyl, naphthyridinyl, quinolinyl, or purinyl.

The term "heterocyclyl" as used herein, means a monocyclic heterocycle or a bicyclic heterocycle. The monocyclic heterocycle is a 5, 6 or 7 membered ring containing at least one heteroatom independently selected from the group consisting of O, N, and S where the ring is saturated or unsaturated, but not aromatic. The 5 membered ring can contain zero or one double bond and one, two or three heteroatoms selected from the group consisting of O, N and S. The 6 or 7 membered ring contains zero, one or two double bonds and one, two or three heteroatoms selected from the group consisting of O, N and S. The bicyclic heterocycle is a monocyclic heterocycle fused to either a phenyl, a monocyclic cycloalkyl, a monocyclic cycloalkenyl, a monocyclic heterocycle, or a monocyclic heteroaryl. Representative examples of heterocycle include, but are not limited to, aziridinyl, diazepanyl, 1,3-dioxanyl, 1,3-dioxolanyl, 1,3-dithiolanyl, 1,3-dithianyl, imidazolinyl, imidazolidinyl, isothiazolinyl, isothiazolidinyl, isoxazolinyl, isoxazolidinyl, maleimidyl, morpholinyl, oxadiazolinyl, oxadiazolidinyl, oxazolinyl, oxazolidinyl, piperazinyl, piperidinyl, pyranyl, pyrazolinyl, pyrazolidinyl, pyrrolinyl, pyrrolidinyl, tetrahydrofuranyl, tetrahydrothienyl, thiadiazolinyl, thiadiazolidinyl, thiazolinyl, thiazolidinyl, thiomorpholinyl, 1,1-dioxidothiomorpholinyl (thiomorpholine sulfone), thiopyranyl, trithianyl, 2,3-dihydrobenzofuran-2-yl, and indolinyl.

The phrase "one or more" substituents, as used herein, refers to a number of substituents that equals from one to the maximum number of substituents possible based on the number of available bonding sites, provided that the above conditions of stability and chemical feasibility are met. Unless otherwise indicated, an optionally substituted group may have a substituent at each substitutable position of the group, and the substituents may be either the same or different. As used herein, the term "independently selected" means that the same or different values may be selected for multiple instances of a given variable in a single compound.

"Optional" or "optionally" means that the subsequently described event or circumstance may or may not occur, and that the description includes instances where said event or circumstance occurs and instances in which it does not. One of ordinary skill in the art would understand that with respect to any molecule described as containing one or more optional substituents, only sterically practical and/or synthetically feasible compounds are meant to be included. "Optionally substituted" refers to all subsequent modifiers in a term, unless stated otherwise.

The term "substituted", as used herein, means that a hydrogen radical of the designated moiety is replaced with the radical of a specified substituent, provided that the substitution results in a stable or chemically feasible compound. The term "substitutable", when used in reference to a designated atom, means that attached to the atom is a hydrogen radical, which can be replaced with the radical of a suitable substituent.

Methods of Preparation

Many general references providing commonly known chemical synthetic schemes and conditions useful for synthesizing the disclosed compounds are available (see, e.g., Smith and March, March's Advanced Organic Chemistry: Reactions, Mechanisms, and Structure, Fifth Edition, Wiley-Interscience, 2001; or Vogel, A Textbook of Practical Organic Chemistry, Including Qualitative Organic Analysis, Fourth Edition, New York: Longman, 1978).

Compounds as described herein can be purified by any of the means known in the art, including chromatographic means, such as HPLC, preparative thin layer chromatography, flash column chromatography and ion exchange chromatography. Any suitable stationary phase can be used, including normal and reversed phases as well as ionic resins. Most typically the disclosed compounds are purified via silica gel and/or alumina chromatography. See, e.g., Introduction to Modern Liquid Chromatography, 2nd Edition, ed. L. R. Snyder and J. J. Kirkland, John Wiley and Sons, 1979; and Thin Layer Chromatography, ed E. Stahl, Springer-Verlag, New York, 1969.

During any of the processes for preparation of the subject compounds, it may be necessary and/or desirable to protect sensitive or reactive groups on any of the molecules concerned. This may be achieved by means of conventional protecting groups as described in standard works, such as J. F. W. McOmie, "Protective Groups in Organic Chemistry," Plenum Press, London and New York 1973, in T. W. Greene and P. G. M. Wuts, "Protective Groups in Organic Synthesis," Third edition, Wiley, New York 1999, in "The Peptides"; Volume 3 (editors: E. Gross and J. Meienhofer), Academic Press, London and New York 1981, in "Methoden der organischen Chemie," Houben-Weyl, 4.sup.th edition, Vol. 15/I, Georg Thieme Verlag, Stuttgart 1974, in H.-D. Jakubke and H. Jescheit, "Aminosauren, Peptide, Proteine," Verlag Chemie, Weinheim, Deerfield Beach, and Basel 1982, and/or in Jochen Lehmann, "Chemie der Kohlenhydrate: Monosaccharide and Derivate," Georg Thieme Verlag, Stuttgart 1974. The protecting groups may be removed at a convenient subsequent stage using methods known from the art.

The compounds disclosed herein can be made using procedures familiar to the person of ordinary skill in the art and as described herein. For example, compounds of the disclosure can be prepared according to Scheme 1 (below), or analogous synthetic schemes. One of skill in the art can adapt the starting materials and the reaction sequence of Scheme 1 to fit the desired target molecule. Of course, in certain situations one of skill in the art will use different reagents to affect one or more of the individual steps or to use protected versions of certain of the substituents. Additionally, one skilled in the art would recognize that compounds of the disclosure can be synthesized using different routes altogether.

EXAMPLES

The preparation of the compounds of the disclosure and the methods of the disclosure are illustrated further by the following examples, which are not to be construed as limiting the disclosure in scope or spirit to the specific procedures and in them.

Example 1: Synthesis of N,N'-(propane-1,2-diyl)bis(N-acetylacetamide) (1) and N-(2-acetamidopropyl)-N-acetylacetamide (2)

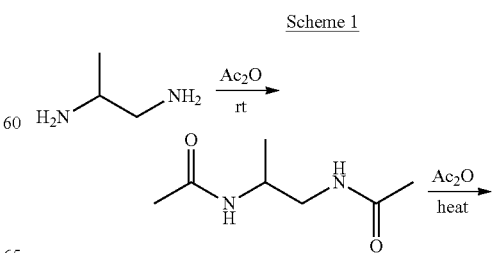

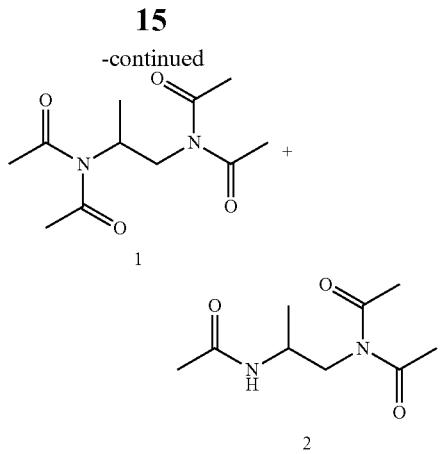

N,N'-(propane-1,2-diyl)bis(N-acetylacetamide) (1; also known as TA(Me)ED) and N-(2-acetamidopropyl)-N-acetylacetamide (2; also known as TriA(Me)ED) were synthesized by treating propylene-1,2-diamine with excessive acetic anhydride ($Ac_2O$) in the presence of triethylamine (TEA) at 100° C. for 20 hours (h) (Scheme 1). The feed ratio of propylene-1,2-diamine:$Ac_2O$:TEA was 1:4.5:3.5 (mol/mol/mol) with 1 g propylene-1,2-diamine. After reaction, DI water was added and the reaction mixture was extracted with dichloromethane (DCM). Most byproducts acetic acid (AcOH), TEA-AcOH salt, and the unreacted N,N'-(propane-1,2-diyl)diacetamide (3; also known as DA(Me)ED) stayed in the aqueous phase, and the product N,N'-(propane-1,2-diyl)bis(N-acetylacetamide) (1) and N-(2-acetamidopropyl)-N-acetylacetamide (2) were enriched in the DCM phase. Pure products were obtained through silica gel column chromatography (ethyl acetate (EtOAc):hexane as eluent, from 1:2 to 10:1 volume ratio). N-(2-acetamidopropyl)-N-acetylacetamide (2) can be further purified by recrystallization, where white needle-like crystals were obtained using DOM:ether:hexane.

$^1$H and $^{13}$C nuclear magnetic resonance (NMR) spectra were recorded on a Varian U500 spectrometer. Chemical shifts were reported in ppm and referenced to the solvent proton impurities. High performance liquid chromatography (HPLC) was performed on a System Gold system (Beckman Coulter, Fullerton, Calif., USA) equipped with a 126P solvent module, a System Gold 128 UV detector, and an analytical Phe-Hex column (5 μm, 100 mm×4.6 mm, Phenomenex). Part of the HPLC tests were performed on a Shimadzu HPLC system (LC-20AT) connected with PDA detector (SPD-M20A). Gradient method was adopted using 0.1% TFA-$H_2O$ and acetonitrile (ACN) as mobile phase. The UV wavelength for detecting N,N'-(propane-1,2-diyl)bis(N-acetylacetamide) (1) and N-(2-acetamidopropyl)-N-acetylacetamide (2) was set at 218 nm.

N,N'-(propane-1,2-diyl)bis(N-acetylacetamide) (1): $^1$H NMR (CDCl$_3$, δ, 500 MHz): 4.30 (m, 1H, CH(CH$_3$)CH$_2$—), 4.04 (d, J=6.88 Hz, 2H, CH(CH$_3$)CH$_2$—), 2.38 (s, 6H, CH$_3$C(=O)—), 2.33 (s, 6H, CH$_3$C(=O)—), 1.38 (d, J=6.93 Hz, 3H, —CH(CH$_3$)CH$_2$—); MS (ESI): m/z [M+Na]$^+$ Calcd. for C$_{11}$H$_{18}$N$_2$O$_4$Na, 265.1164; Found: 265.1165.

N-(2-acetamidopropyl)-N-acetylacetamide (2): $^1$H NMR (CDCl3, δ, 500 MHz): 5.86 (s, 1H, —NHCH(CH$_3$)CH$_2$), 4.16 (m, 1H, NHCH(CH$_3$)CH$_2$), 3.97 (dd, J$_1$=9.74 Hz, J$_2$=14.8 Hz, 1H, NHCH(CH$_3$)CH$_2$), 3.55 (dd, J$_1$=5.10 Hz, J$_2$=14.8 Hz, 1H, NHCH(CH$_3$)CH$_2$), 2.44 (s, 6H, CH$_3$C (=O)), 1.91 (s, 3H, CH$_3$C(=O)), 1.17 (d, J=6.56 Hz, 3H, NHCH(CH$_3$)CH$_2$); MS (ESI): m/z [M+Na]$^+$ Calcd. for C$_{11}$H$_{18}$N$_2$O$_4$Na, 265.1164; Found: 265.1165.

N,N'-(propane-1,2-diyl)diacetamide (3): $^1$H NMR (CDCl3, δ, 500 MHz): 6.44 (s, 1H, —NHCH(CH$_3$) CH$_2$NH—), 6.18 (s, 1H, —NHCH(CH$_3$)CH$_2$NH—), 4.03 (m, 1H, —NHCH(CH$_3$)CH$_2$NH—), 3.34 (m, 1H, —NHCH(CH$_3$)CH$_2$NH—), 3.20 (m, 1H, —NHCH(CH$_3$)CH$_2$NH—), 1.98 (s, 3H, CH$_3$C(=O)—), 1.96 (s, 3H, CH$_3$C(=O)—), 1.16 (d, J=6.68 Hz, 3H, —NHCH(CH$_3$)CH$_2$NH—).

Example 2: Evaluation of N,N'-(propane-1,2-diyl)bis(N-acetylacetamide) (1) and N-(2-acetamidopropyl)-N-acetylacetamide (2)

To study the hydrolytic degradation, 1 and 2 were dissolved in Tris buffer (pH 8.0, 0.1 M):acetonitrile (can) mixture (3:1, v/v) at 50 μg/mL. The perhydrolytic degradation was evaluated at similar conditions in the presence of sodium perborate (10 equiv.). Commercially available bleach activator, tetraacetylethylenediamine (TAED), was used as a control. The mixture was incubated at room temperature (20° C.) for 20 days. At different time intervals, an aliquot of the solution was taken out and analyzed by HPLC. The concentration of 1 and 2 was quantified by UV-vis absorption at $\Delta_{max}$=218 nm through standard curve. For the bleaching test, 1, 2, TAED, and other control molecules (20 mg) were treated with commercially available food dyes (100× dilution, 1 mL) and hydrogen peroxide ($H_2O_2$, 30%, 1 mL). The mixtures were incubated at room temperature (20° C.) and checked at different time intervals to monitor the bleaching of the dyes.

Both N,N'-(propane-1,2-diyl)bis(N-acetylacetamide) (1) and N-(2-acetamidopropyl)-N-acetylacetamide (2) surprisingly exhibited slower degradation compared with TAED, the widely used bleach activator, suggesting the α-methyl group on the diamine backbone slowed down the hydrolysis rate (FIG. 1A). The hydrolysis of all compounds followed first-order kinetics, where a linear relationship of ln([M]$_0$/[M]$_t$) vs time was observed (FIG. 1B). The calculated rate constant from the slopes in the kinetic plots are listed in Table 1. In the presence of sodium persalts (10 equiv.), however, the perhydrolysis rates were comparable among TAED, 1, and 2. Although the perhydrolytic degradation followed the same order as hydrolytic degradation (TAED>1>2), the perhydrolysis of all three molecules finished within 72 h (<5% left). Therefore, N,N'-(propane-1,2-diyl)bis(N-acetylacetamide) (1) and N-(2-acetamidopropyl)-N-acetylacetamide (2) with more hydrophobic, sterically hindered backbones than TAED had surprisingly better resistance against hydrolysis and comparable perhydrolysis degradation in the presence of persalts than TAED and are consequently superior alternatives to TAED as bleach activators.

TABLE 1

Degradation kinetic constants of TAED, 1, and 2

| | $k_H$ (h$^{-1}$) | $t_{1/2,H}$ (h) | $k_H + k_P$ (h$^{-1}$) | $K_P$ (h$^{-1}$) |
| --- | --- | --- | --- | --- |
| TAED | 0.0091 | 76 | 0.135 | 0.126 |
| 1 | 0.0038 | 181 | 0.062 | 0.058 |
| 2 | 0.0015 | 462 | 0.059 | 0.057 |

H = hydrolysis,
P = perhydrolysis

Figure 2:
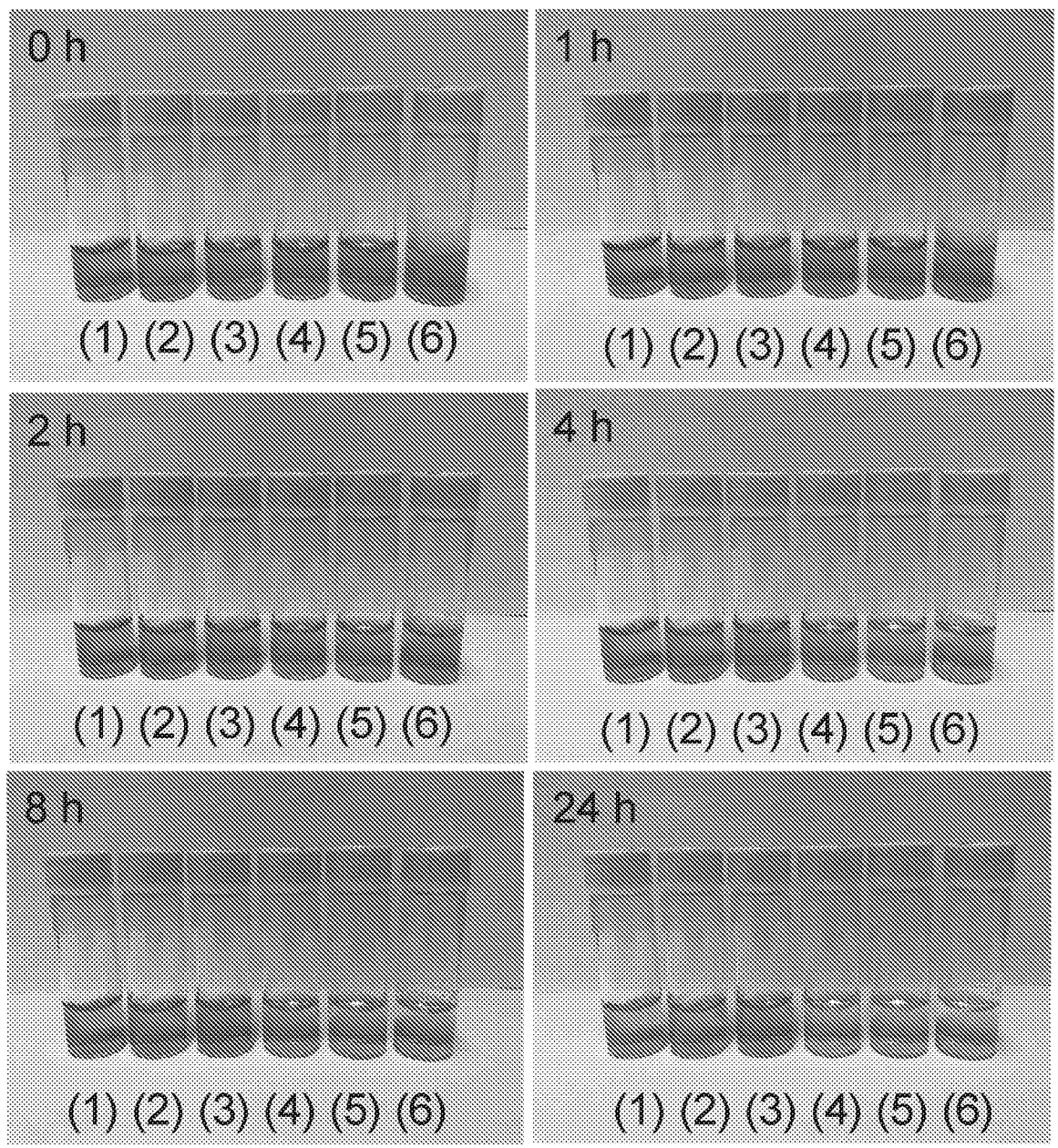
FIG. 2 shows photo images of food dyes at different times after treatment with various compounds.

The compounds of the invention were subjected to a bleaching test. The food dye was purchased from Adams Extract, and diluted 500 times with Tris buffer (pH 8.0, 0.1 M) before use. The diluted food dye was mixed with $H_2O_2$ (30%) in 1:1 ratio (v/v). For every 10 mg of TAED/TA(Me)ED/TriA(Me)ED, 1 mL of food dye/$H_2O_2$ mixture was added. The results of the bleaching test are shown in FIG. 2. The widely used bleach activator TAED actively reacted with $H_2O_2$, and the blue color disappeared after about 24 hours. N,N'-(propane-1,2-diyl)bis(N-acetylacetamide) (1), with one more methyl group on the diamine core, exhibited similar activation ability and bleached the blue color after 24 hours. N-(2-acetamidopropyl)-N-acetylacetamide (2) with better stability and one less active site (one imide group per molecule) for peracetic acid generation, showed much slower bleaching action, where the blue color slowly faded away after 24 hours of treatment. Both N,N'-(propane-1,2-diyl)bis(N-acetylacetamide) (1) and N-(2-acetamidopropyl)-N-acetylacetamide (2) exhibited similar activation ability and bleached the blue color after 24 hours (h). As a comparison, diacetylethylenediamine (DAED) and N,N'-(propane-1,2-diyl)diacetamide (3) with no available imide groups behaved as expected and did not exhibit any bleaching activation effect.

Example 3: Synthesis of N,N'-(butane-1,2-diyl)bis(N-acetylacetamide) (5) and N,N'-(butane-2,3-diyl)bis(N-acetylacetamide) (6)

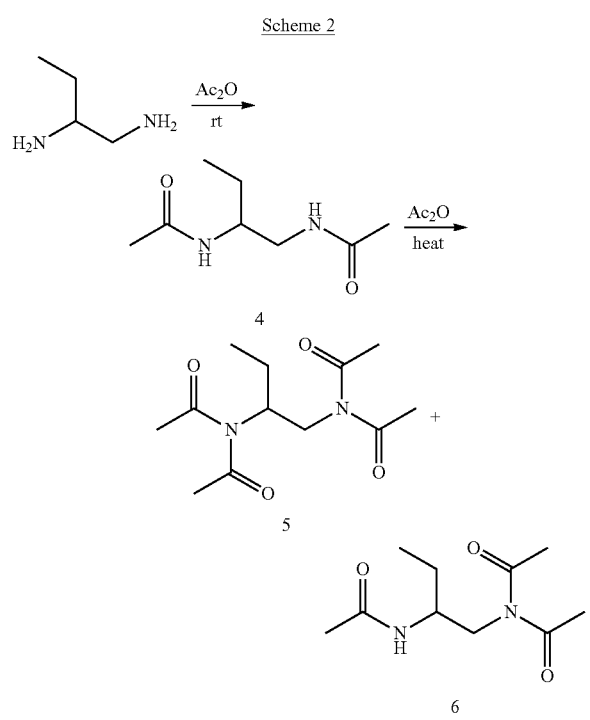

Butanene-1,2-diamine is treated with excessive acetic anhydride ($Ac_2O$) in the presence of triethylamine (TEA) at 100° C. for 20 h (Scheme 2). The feed ratio of butane-1,2-diamine:$Ac_2O$:TEA is about 1:4.5:3.5 (mol/mol/mol) with 1 g butane-1,2-diamine. After reaction, DI water is added and the reaction mixture is extracted with dichloromethane (DCM). Most byproducts acetic acid (AcOH), TEA-AcOH salt, and the unreacted N,N'-(butane-1,2-diyl)diacetamide (4) stay in the aqueous phase, and the product N,N'-(butane-1,2-diyl)bis(N-acetylacetamide) (5; also known as TA(Et)ED) and N-(2-acetamidobutyl)-N-acetylacetamide (6; also known as TriA(Et)ED) are enriched in the DCM phase. Pure products are obtained through silica gel column chromatography.

Examples 4-7

The compounds in Table 2 of the disclosure can be prepared essentially by the method provided in Example 1.

TABLE 2

| Example No. | Chemical Formula | Chemical Name |
| --- | --- | --- |
| 4 | | N,N'-(pentane-2,3-diyl)bis(N-acetylacetamide) |
| 5 | | N-(3-acetamidopentan-2-yl)-N-acetylacetamide |
| 6 | | N,N'-(1,2-phenylene)bis(N-acetylacetamide) |
| 7 | | N-(2-acetamidophenyl)-N-acetylacetamide |

It is understood that the examples and embodiments described herein are for illustrative purposes only and that various modifications or changes in light thereof will be suggested to persons skilled in the art and are to be incorporated within the spirit and purview of this application and scope of the appended claims. All publications, patents, and patent applications cited herein are hereby incorporated herein by reference for all purposes.

What is claimed is:

1. An aqueous composition comprising one or more active oxygen agents, and at least one compound of the formula (I):

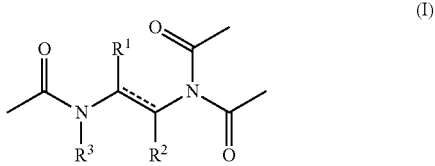

or a salt thereof, wherein
===  represents a single or double bond, provided that the bond satisfies the valence requirement of the C atoms;
$R^1$ is $C_1$-$C_4$ alkyl, $C_2$-$C_4$ alkenyl, or $C_2$-$C_4$ alkynyl, each of which is independently optionally substituted with one or more $R^4$;
$R^2$ is hydrogen, $C_1$-$C_4$ alkyl, $C_2$-$C_4$ alkenyl, or $C_2$-$C_4$ alkynyl, each of which is independently optionally substituted with one or more $R^5$;
or $R^1$ and $R^2$ together with the atoms to which they are attached form an aryl, heteroaryl, heterocyclyl, or $C_5$-$C_8$ cycloalkyl ring; and
$R^3$ is hydrogen or acetyl;
wherein each $R^4$ and $R^5$ are independently selected from the group consisting of $C_3$-$C_8$ cycloalkyl, aryl, heteroaryl, and heterocyclyl.

2. The composition of claim 1, wherein ===  represents a single bond.

3. The composition of claim 1, wherein
$R^1$ is $C_1$-$C_4$ alkyl optionally substituted with one or more $R^4$.

4. The composition of claim 1, wherein
$R^2$ is hydrogen; or
$R^2$ is $C_1$-$C_4$ alkyl optionally substituted with one or more $R^5$;
or
$R^2$ is $C_1$-$C_2$ alkyl optionally substituted with one or more $R^4$.

5. The composition of any of claim 1, wherein $R^3$ is acetyl; or $R^3$ is hydrogen.

6. The composition of claim 1, wherein the compound of formula (I) is:

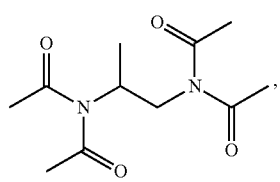,

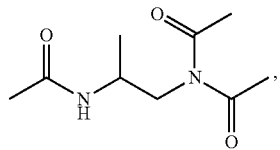,

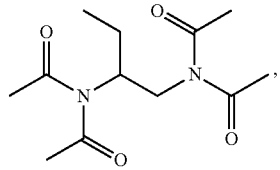,

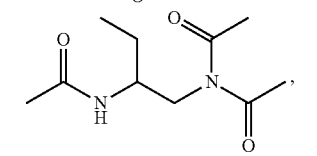,

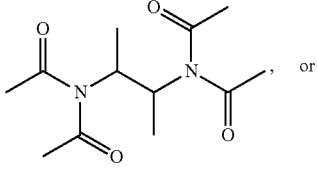, or

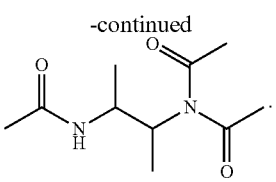.

7. The composition of claim 1, wherein the one or more active oxygen agents is selected from the group consisting of peroxygen compounds, peroxygen compound adducts, hydrogen peroxide, hydrogen peroxide liberating or generating compounds, inorganic or organic peroxyacids, peroxycarboxylic acids, percarbonates, perborates, peroxyhydrates, persilicates, persulfates, and combinations thereof.

8. The composition of claim 1, wherein the compound of formula (I) is present in an amount of within the range of about 0.5 wt % to about 10 wt %, based on the total weight of the composition.

9. The composition of any of claim 1, wherein the composition is substantially free of tetraacetylethylenediamine.

10. A detergent composition comprising one or more surfactants and the composition of claim 1.

11. The detergent composition of claim 10, wherein the one or more surfactants is present in an amount of about 0.5 wt % to about 70 wt %, based on the total weight of the detergent composition.

12. The detergent composition of claim 10 in a liquid form.

13. A method of treating a soiled substrate, the method comprising contacting the substrate with the detergent composition of claim 10.

14. A method of disinfecting a substrate, the method comprising contacting the substrate with the composition of any of claim 1.

15. A method for producing a peracetic acid solution, the method comprising reacting in aqueous solution an active oxygen agent and a compound of the formula (I):

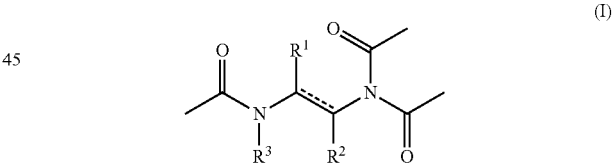

(I)

or a salt thereof, wherein
===  represents a single or double bond, provided that the bond satisfies the valence requirement of the C atoms;
$R^1$ is $C_1$-$C_4$ alkyl, $C_2$-$C_4$ alkenyl, or $C_2$-$C_4$ alkynyl, each of which is independently optionally substituted with one or more $R^4$;
$R^2$ is hydrogen, $C_1$-$C_4$ alkyl, $C_2$-$C_4$ alkenyl, or $C_2$-$C_4$ alkynyl, each of which is independently optionally substituted with one or more $R^5$;
or $R^1$ and $R^2$ together with the atoms to which they are attached form an aryl, heteroaryl, heterocyclyl, or $C_5$-$C_8$cycloalkyl ring; and
$R^3$ is hydrogen or acetyl;
wherein each $R^4$ and $R^5$ are independently selected from the group consisting of $C_3$-$C_8$ cycloalkyl, aryl, heteroaryl, and heterocyclyl,
to perhydrolyse the amide bond.

16. The composition of claim 1 wherein the one or more active oxygen agents is present in an amount of about 0.5 wt % to about 20 wt %, based on the total weight of the composition.

17. The composition of claim 1 wherein no more than 1 wt % of TAED is present in the composition, based on the total weight of the composition.

18. The composition of claim 9, wherein the composition is in liquid form having a pH-value within the range of about 8 to about 12.

19. The composition of claim 9, wherein the composition is in a gel form.

20. The composition of claim 9, wherein the composition is in a gel form, and when dissolved in water has a pH-value within the range of about 8 to about 12.

* * * * *